Sept. 3, 1940.   W. KALBSKOPF   2,213,843
VOLTAGE MULTIPLIER
Filed Feb. 21, 1939

Inventor:
Walter Kalbskopf
by E. O. Phinney
Att'y

Patented Sept. 3, 1940

2,213,843

UNITED STATES PATENT OFFICE 2,213,843

VOLTAGE MULTIPLIER

Walter Kalbskopf, Nuremberg, Germany, assignor to Suddeutsche Apparate-Fabrik, Nuremberg, Germany, a company Application February 21, 1939, Serial No. 257,695
In Germany January 28, 1938

2 Claims. (Cl. 171—97)

There are voltage multipliers that have been devised by Marx and others devised by Greinacher. Those of the first type serve to convert continuous current into current of the same kind, that is, uni-directional current. This arrangement, however, is only suitable in the case of maximum voltages. The second said arrangement serves to rectify an alternating current and at the same time to multiply the voltage.

It is also known to produce continuous voltage impulses and to convey these to a circuit arrangement comprising choke coils, condensers and a valve, the object being to convert the primary uni-directional voltage into another uni-directional voltage which, for instance, is higher than the former. This arrangement, however, only enables a small multiplication of the continuous voltage.

In accordance with the invention a plurality of condensers and choke coils connected in series are charged over valves by a source of uni-directional voltage impulses. The condensers and choke coils are connected in parallel during the charging process. During the period of discharging into a utilization circuit the condensers are interconnected in series and are connected in series also with the choke coils which in their turn are likewise arranged in series connection. This will be understood from the following description, reference being had to the accompanying drawing, in which Fig. 1 shows the circuit arrangement of one embodiment of the invention, while Fig. 2 represents the wiring diagram of an auxiliary arrangement adapted for use with devices according to Fig. 1.

Figure 1:
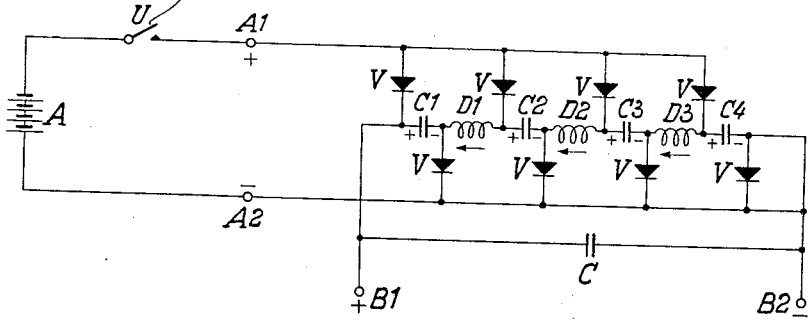

By supplying a voltage impulse of predetermined duration to terminals A1, A2, Fig. 1, first condensers C1, C2, C3, C4 are charged in parallel connection over valves V. Thereupon a current gradually begins to flow through choke coils D1, D2, D3 and in the direction indicated by arrows. Preferably, the duration of the voltage impulses supplied to the terminals A1, A2 is so chosen that each impulse decreases as soon as the condensers have been charged. With the impulse ceasing the sum of all the condenser voltages is effective at terminals B1, B2. In addition the self-induction voltages of the choke coils are effective here, that is, voltages which are able to assume high values in consequence of the field rapidly disappearing. In this way, at terminals B1, B2 a total voltage will be effective which is at least as many times greater than the input voltage at the terminals A1, A2 as there are choke coils and condensers. For instance, in the case of a multiplying arrangement having three choke coils and four condensers a final voltage of 950 volts was obtained from an input voltage of 100 volts. The valves V included in the supply lines are especially selenium rectifiers and prevent the component voltages from compensating one another between the condensers and choke coils. Connected in parallel with the terminals B1, B2 may be a capacity C.

Figure 2:
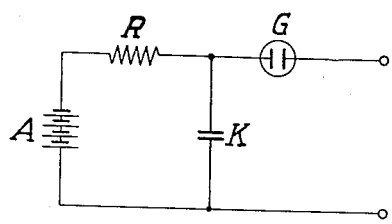

The uni-directional voltage impulses to be supplied to the terminals A1, A2 from a current source A may be produced by means of an interrupter U, Fig. 1, of any type, or by means of the well known glow lamp relaxation arrangement represented in Fig. 2. In the latter case a condenser K is charged over a resistance R. With the glow lamp G attaining its ignition tension condenser K will discharge across this lamp. Such action recurs after the darkening of lamp G.

What is claimed is:

1. A voltage multiplier comprising, means for producing uni-directional voltage impulses, a plurality of condenser and choke coil combinations connected in series, a plurality of unidirective conductive means connecting said condenser choke coil combinations in parallel across said source whereby said combinations are effectively in parallel during charging, and an output circuit connected across said series connection of said combinations whereby said combinations are effectively in series in said output during discharging position of said means.

2. A voltage multiplier according to claim 1, wherein said means for producing uni-directive voltage impulses comprises a source of direct current, a condenser connected across said source to be charged thereby, and a glow lamp connected in series with said source and condenser combination whereby when voltage fills up on said condenser from said source said glow lamp ignites to discharge said charge from said condenser.

WALTER KALBSKOPF.